United States Patent
Schwerdtfeger et al.

(10) Patent No.: US 9,505,856 B1
(45) Date of Patent: Nov. 29, 2016

(54) METHODS FOR MAKING FLUORIDED CHROMIUM (VI) CATALYSTS, AND POLYMERIZATION PROCESSES USING THE SAME

(71) Applicant: Chevron Phillips Chemical Company LP, The Woodlands, TX (US)

(72) Inventors: Eric D. Schwerdtfeger, Bartlesville, OK (US); Kathy S. Clear, Bartlesville, OK (US); Max P. McDaniel, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/994,189

(22) Filed: Jan. 13, 2016

(51) Int. Cl.
| | |
|---|---|
| *C08F 4/24* | (2006.01) |
| *C08F 4/44* | (2006.01) |
| *B01J 27/06* | (2006.01) |
| *B01J 21/00* | (2006.01) |
| *B01J 23/00* | (2006.01) |
| *C08F 110/02* | (2006.01) |
| *B01J 27/132* | (2006.01) |
| *B01J 27/135* | (2006.01) |
| *B01J 35/10* | (2006.01) |
| *B01J 37/08* | (2006.01) |
| *B01J 37/26* | (2006.01) |
| *C08F 110/06* | (2006.01) |

(52) U.S. Cl.
CPC ............ *C08F 110/02* (2013.01); *B01J 27/132* (2013.01); *B01J 27/135* (2013.01); *B01J 35/1019* (2013.01); *B01J 35/1023* (2013.01); *B01J 37/08* (2013.01); *B01J 37/26* (2013.01); *C08F 110/06* (2013.01)

(58) Field of Classification Search
CPC .......... B01J 27/06; B01J 21/00; B01J 23/00; C08F 4/24; C08F 4/44
USPC .................... 502/224, 256, 319; 526/98, 106
See application file for complete search history.

(56) References Cited

U.S. PATENT DOCUMENTS

| | | | |
|---|---|---|---|
| 3,242,099 A | 3/1966 | Manyik et al. | |
| 3,248,179 A | 4/1966 | Norwood | |

(Continued)

FOREIGN PATENT DOCUMENTS

WO      WO 99/60033      11/1999

OTHER PUBLICATIONS

McDaniel, Max P., "*Advances in Catalysis*," vol. 53, Burlington: Academic Press, 2010, pp. 123-127.

(Continued)

*Primary Examiner* — Alexa Neckel
*Assistant Examiner* — Elizabeth Eng
(74) *Attorney, Agent, or Firm* — Merchant & Gould P.C.

(57) ABSTRACT

Methods for preparing a fluorided chromium catalyst can include a step of calcining a supported chromium catalyst at a peak calcining temperature to produce a calcined supported chromium catalyst, followed by contacting the calcined supported chromium catalyst at a peak fluoriding temperature with a vapor comprising a fluorine-containing compound to produce the fluorided chromium catalyst. The peak fluoriding temperature can be at least 50° C. less, and often from 200° C. to 500° C. less, than the peak calcining temperature. Polymers produced using the fluorided chromium catalyst can have a beneficial combination of higher melt index, narrower molecular weight distribution, and lower long chain branch content.

19 Claims, 3 Drawing Sheets

(56) References Cited

U.S. PATENT DOCUMENTS

| | | | |
|---|---|---|---|
| 3,953,413 A | 4/1976 | Hwang et al. | |
| 4,146,695 A | 3/1979 | van de Leemput | |
| 4,501,885 A | 2/1985 | Sherk et al. | |
| 4,588,790 A | 5/1986 | Jenkins, III et al. | |
| 4,788,171 A | 11/1988 | Klendworth | |
| 4,794,096 A | 12/1988 | Ewen | |
| 4,803,253 A | 2/1989 | McDaniel et al. | |
| 4,808,561 A | 2/1989 | Welborn, Jr. | |
| 5,001,204 A | 3/1991 | Klendworth et al. | |
| 5,284,926 A * | 2/1994 | Benham | C08F 10/00 502/104 |
| 5,352,749 A | 10/1994 | DeChellis et al. | |
| 5,401,820 A | 3/1995 | McDaniel et al. | |
| 5,436,304 A | 7/1995 | Griffin et al. | |
| 5,565,175 A | 10/1996 | Hottovy et al. | |
| 5,575,979 A | 11/1996 | Hanson | |
| 5,576,259 A | 11/1996 | Hasegawa et al. | |
| 5,648,439 A | 7/1997 | Bergmeister et al. | |
| 5,723,399 A | 3/1998 | Takemoto et al. | |
| 5,739,220 A | 4/1998 | Shamshoum et al. | |
| 5,807,938 A | 9/1998 | Kaneko et al. | |
| 5,919,983 A | 7/1999 | Rosen et al. | |
| 6,011,127 A | 1/2000 | Monoi et al. | |
| 6,096,679 A | 8/2000 | Lonfils et al. | |
| 6,107,230 A | 8/2000 | McDaniel et al. | |
| 6,239,235 B1 | 5/2001 | Hottovy et al. | |
| 6,262,191 B1 | 7/2001 | Hottovy et al. | |
| 6,750,302 B1 | 6/2004 | McDaniel et al. | |
| 6,833,415 B2 | 12/2004 | Kendrick et al. | |
| 7,163,906 B2 | 1/2007 | McDaniel et al. | |
| 7,294,599 B2 | 11/2007 | Jensen et al. | |
| 7,601,665 B2 | 10/2009 | McDaniel et al. | |
| 7,763,561 B2 | 7/2010 | McDaniel et al. | |
| 7,884,163 B2 | 2/2011 | McDaniel et al. | |
| 8,114,946 B2 | 2/2012 | Yang et al. | |
| 8,309,485 B2 | 11/2012 | Yang et al. | |
| 8,916,494 B2 | 12/2014 | McDaniel et al. | |
| 9,068,027 B2 | 6/2015 | McDaniel et al. | |
| 2004/0059070 A1 | 3/2004 | Whitte | |
| 2014/0058054 A1 * | 2/2014 | McDaniel | C08F 110/02 526/135 |
| 2015/0191554 A1 | 7/2015 | McDaniel et al. | |

OTHER PUBLICATIONS

Arnett et al., "Zero-Shear Viscosity of Some Ethyl Branched Paraffinic Model Polymers," Journal of Physical Chemistry, 1980, 84(6), pp. 649-652.

Bird et al., "Dynamics of Polymeric Liquids," vol. 1, Fluid Mechanics, 2nd Edition, John Wiley & Sons, 1987, 3 pages.

Film Extrusion Manual—Process, Materials, Properties, TAPPI Press, 1992, 16 pages.

Hieber et al., "Shear-Rate-Dependence Modeling of Polymer Melt Viscosity," Polymer Engineering and Science, 1992, 32(14), pp. 931-938.

Hieber et al., "Some correlations involving the shear viscosity of polystyrene melts," Rheologica Acta, 1989, vol. 28, pp. 321-332.

Janzen et al., "Diagnosing long-chain branching in polyethylenes," Journal of Molecular Structure, 1999, 485-486, pp. 569-584.

Modern Plastics Encyclopedia, Mid-Nov. 1995 Issue, vol. 72, No. 12, 3 pages.

Yu, et al. entitled "Long Chain Branches in Metallocene-Catalyzed Polyethylene Determined by a Combination of SEC/Multi-Angle Light Scattering, NMR and Rheology," published in Polymer Preprints 2003, vol. 44 (2), pp. 49-50.

* cited by examiner

METHODS FOR MAKING FLUORIDED CHROMIUM (VI) CATALYSTS, AND POLYMERIZATION PROCESSES USING THE SAME

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Traditional chromium-based catalyst systems can produce olefin polymers having, for example, good extrusion processibility and polymer melt strength, typically due to their broad molecular weight distribution (MWD). In some end-use applications, it can be beneficial for the olefin polymer also to have lower levels of long chain branching. Moreover, it can be beneficial for the catalyst system employed to have a high catalytic activity for olefin polymerization, as well as a greater potential for a broader range of polymer melt index and molecular weight. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Processes for producing fluorided chromium catalysts are disclosed and described herein. One such process for producing a fluorided chromium catalyst can comprise (a) calcining a supported chromium catalyst at a peak calcining temperature to produce a calcined supported chromium catalyst, and (b) contacting the calcined supported chromium catalyst at a peak fluoriding temperature with a vapor comprising a fluorine-containing compound to produce the fluorided chromium catalyst. In this process, the peak fluoriding temperature can be at least about 50° C. less than the peak calcining temperature, for instance, from about 200° C. to about 500° C. less.

Fluorided chromium catalysts of the present invention can be used to polymerize olefins to form homopolymers, copolymers, terpolymers, and the like. One such process for polymerizing olefins can comprise contacting a fluorided chromium catalyst (e.g., produced by any process to produce a fluorided chromium catalyst disclosed herein) and an optional co-catalyst with an olefin monomer and an optional olefin comonomer in a polymerization reactor system under polymerization conditions to produce an olefin polymer. The fluorided chromium catalyst has excellent catalyst activity in olefin polymerization processes, and can produce olefin polymers having beneficial combinations of HLMI, $I_{21}/I_{10}$, Mw/Mn, and long chain branch content.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
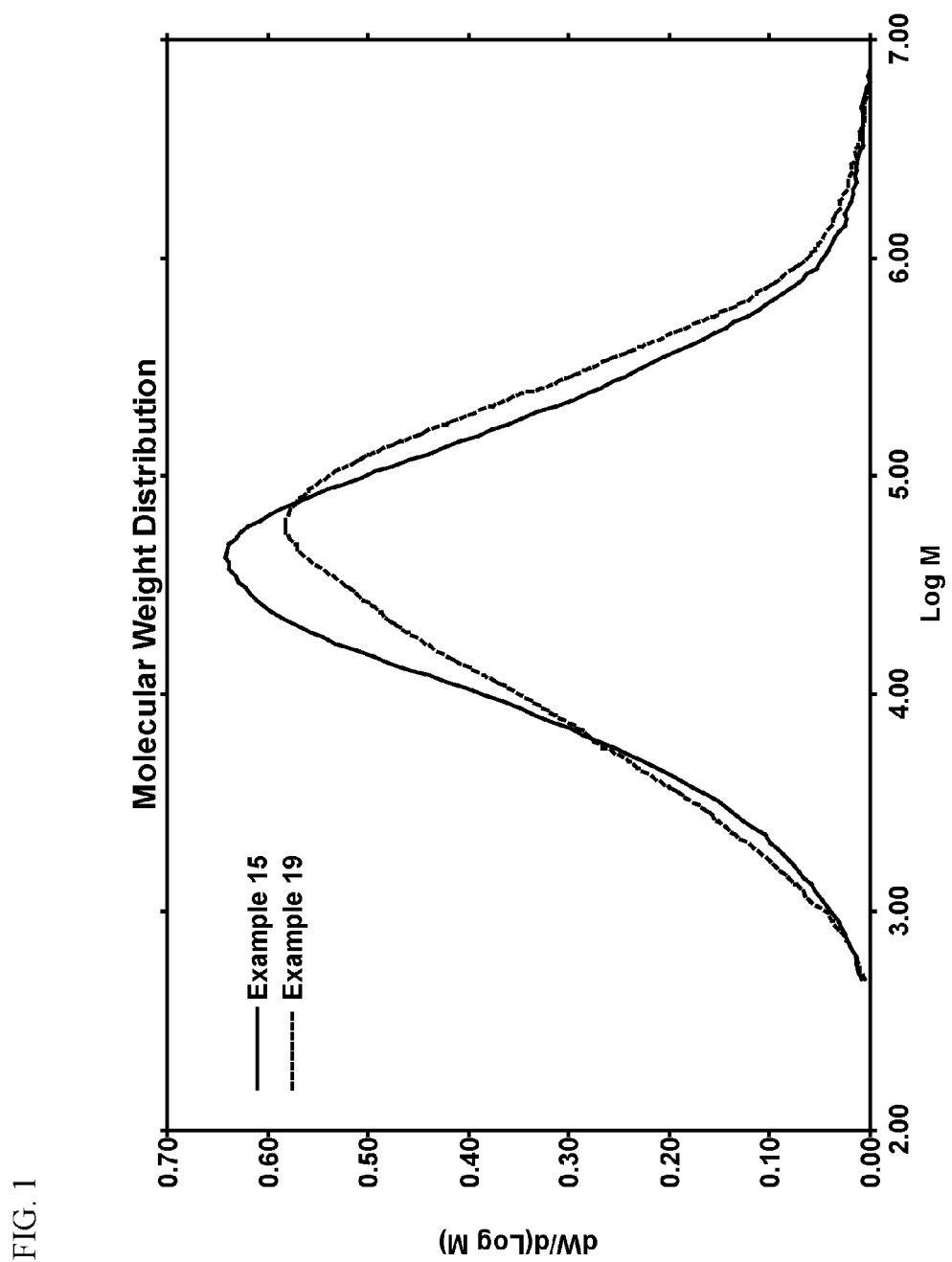
FIG. 1 presents a plot of the molecular weight distributions of the polymers of Examples 15 and 19.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise.

The terms "a," "an," and "the" are intended to include plural alternatives, e.g., at least one, unless otherwise specified. For instance, the disclosure of "a supported chromium catalyst," or "a fluorine-containing compound" is meant to encompass one, or mixtures or combinations of more than one, supported chromium catalyst or fluorine-containing compound, unless otherwise specified.

Generally, groups of elements are indicated using the numbering scheme indicated in the version of the periodic table of elements published in Chemical and Engineering News, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce an olefin copolymer.

The term "co-catalyst" is used generally herein to refer to compounds such as aluminoxane compounds, organoboron compounds, organoaluminum compounds, and the like, that can constitute one component of a catalyst composition, when used, for example, in addition to a chromium catalyst or fluorided chromium catalyst. The term "co-catalyst" is used regardless of the actual function of the compound or any chemical mechanism by which the compound may operate.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst or the chromium catalyst after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe compositions and methods wherein the components are contacted together in any order, in any manner, and for any length of time, unless otherwise specified. For example, the components can be contacted by blending or mixing. Further, unless otherwise specified, the contacting of any component can occur in the presence or absence of any other component of the compositions and methods described herein. Combining additional materials or components can be done by any suitable technique. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can refer to materials which are blended, mixed, slurried, dissolved, reacted, treated, or otherwise contacted in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the processes provided herein can employ, in certain aspects, a peak fluoriding temperature that can be from about 200° C. to about 500° C. less than the peak calcining temperature. By a disclosure that the peak fluoriding temperature can be from about 200° C. to about 500° C. less than the peak calcining temperature, the intent is to recite that this temperature difference can be any temperature difference in this range and can be, for example, equal to about 200° C., about 250° C., about 300° C., about 350° C., about 400° C., about 450° C., or about 500° C. Additionally, the difference in temperature between the peak fluoriding temperature and the peak calcining temperature can be within any range from about 200° C. to about 500° C. (for example, the temperature difference can be from about 250° C. to about 400° C.), and this also includes any combination of ranges between about 200° C. and about 500° C. Likewise, all other ranges disclosed herein should be interpreted in a manner similar to this example.

DETAILED DESCRIPTION OF THE INVENTION

The present invention is directed generally to fluorided chromium catalysts, methods for preparing the fluorided chromium catalysts, catalyst compositions containing the fluorided chromium catalysts, methods for using the fluorided chromium catalysts to polymerize olefins, the polymer resins produced using such catalysts and polymerization processes, and articles produced using these polymer resins.

Fluorided Chromium Catalysts

Various processes for producing a fluorided chromium catalyst are disclosed and described herein. One such process to produce a fluorided chromium catalyst can comprise (or consist essentially of, or consist of) (a) calcining a supported chromium catalyst at a peak calcining temperature to produce a calcined supported chromium catalyst, and (b) contacting the calcined supported chromium catalyst at a peak fluoriding temperature with a vapor comprising a fluorine-containing compound to produce the fluorided chromium catalyst. Typically, the peak fluoriding temperature can be at least about 50° C. less than the peak calcining temperature.

Generally, the features of any of the processes disclosed herein (e.g., the supported chromium catalyst, the conditions under which the calcining step is conducted (such as the peak calcining temperature), the fluorine-containing compound, and the conditions under which the fluoriding step is conducted (such as the peak fluoriding temperature), among others) are independently described herein, and these features can be combined in any combination to further describe the disclosed processes. Moreover, other process steps can be conducted before, during, and/or after any of the steps listed in the disclosed processes, unless stated otherwise. Additionally, fluorided chromium catalysts produced in accordance with the disclosed methods/processes are within the scope of this disclosure and are encompassed herein.

The steps in the disclosed processes for producing fluorided chromium catalysts can be performed using any suitable apparatus. For example, a fluidized bed is especially convenient, operated in either a batch or continuous manner. Alternatively, the process can be performed in a fixed bed, or in a tray or other still container, or by a rotary calciner, or any other suitable furnace-type equipment.

Step (a) of the process often can be referred to as the calcining step, and in the calcining step, a supported chromium catalyst can be calcined at a peak calcining temperature to produce a calcined supported chromium catalyst. The calcining step can be conducted at a variety of temperatures and time periods, which are generally selected to convert all or a portion of the chromium to hexavalent chromium. For instance, the calcining step can be conducted at a peak calcining temperature in a range from about 500° C. to about 900° C.; alternatively, from about 600° C. to about 871° C.; alternatively, from about 600° C. to about 850° C.; alternatively, from about 700° C. to about 850° C.; alternatively, from about 725° C. to about 900° C.; alternatively, from about 725° C. to about 871° C.; alternatively, from about 725° C. to about 850° C.; alternatively, from about 750° C. to about 871° C.; or alternatively, from about 750° C. to about 850° C. In these and other aspects, these temperature ranges also are meant to encompass circumstances where the calcining step is conducted at a series of different temperatures (e.g., an initial calcining temperature, a peak calcining temperature), instead of at a single fixed temperature, falling within the respective ranges. For instance, the calcining step can start at an initial calcining temperature, and subsequently, the temperature of the calcining step can be increased to the peak calcining temperature, for example, a peak calcining temperature in a range from about 600° C. to about 850° C., or from about 725° C. to about 900° C.

The duration of the calcining step is not limited to any particular period of time. Hence, the calcining step can be conducted, for example, in a time period ranging from as little as 45 minutes to as long as 12-24 hours, or more. The appropriate calcining time can depend upon, for example, the initial/peak calcining temperature, among other variables. Generally, however, the calcining step can be conducted in a time period that can be in a range from about 45 minutes to about 18 hours, such as, for example, from about 45 minutes to about 15 hours, from about 1 hour to about 12 hours, from about 2 hours to about 12 hours, from about 3 hours to about 10 hours, or from about 5 hours to about 10 hours.

Consistent with aspects of this invention, calcining of the supported chromium catalyst can be performed in an ambient atmosphere (e.g., an oxidizing atmosphere), for example, a dry ambient atmosphere. Hence, the calcining step can be performed in an atmosphere comprising air, a mixture of oxygen and air, a mixture of oxygen and an inert gas, pure oxygen, and so forth. Since the calcining gas stream can comprise air, the calcining gas stream can comprise about 20-21 mole % oxygen. However, dilute oxygen calcining gas streams can be employed, such as those having less than about 15 mole %, or less than about 10 mole % oxygen. For example, suitable ranges for the mole % of oxygen in the calcining gas stream can include, but are not limited to, the following ranges: from about 0.1 to about 25 mole %, from about 1 to about 21 mole %, from about 2 to about 21 mole %, from about 1 to about 10 mole %, from about 15 to about 25 mole %, or from about 5 to about 15 mole %, and the like.

Step (b) of the process for producing a fluorided chromium catalyst often can be referred to as the contacting step or the fluoriding step, and in this step, the calcined supported chromium catalyst can be contacted with a vapor comprising a fluorine-containing compound to produce the fluorided chromium catalyst. The fluoriding step can be conducted at a variety of temperatures and time periods. For instance, the fluoriding step can be conducted at a peak fluoriding temperature in a range from about 300° C. to about 675° C.; alternatively, from about 300° C. to about 650° C.; alternatively, from about 300° C. to about 500° C.; alternatively, from about 350° C. to about 600° C.; alternatively, from about 350° C. to about 500° C.; alternatively, from about 400° C. to about 600° C.; or alternatively, from about 400° C. to about 500° C. In these and other aspects, these temperature ranges also are meant to encompass circumstances where the contacting step is conducted at a series of different temperatures (e.g., an initial fluoriding temperature, a peak fluoriding temperature), instead of at a single fixed temperature, falling within the respective ranges. For instance, the contacting step can start at an initial fluoriding temperature, and subsequently, the temperature of the contacting step can be increased to the peak fluoriding temperature, for example, in a range from about 300° C. to about 500° C., or from about 350° C. to about 500° C.

The duration of the fluoriding (or contacting) step is not limited to any particular period of time. Hence, the fluoriding step can be conducted, for example, in a time period ranging from as little as 30 seconds to as long as 12-24 hours, or more. The appropriate duration of the fluoriding step can depend upon, for example, the initial/peak fluoriding temperature, the atmosphere under which fluoriding is conducted, and the amount of fluorine in the vapor stream, among other variables. Generally, however, the fluoriding step can be conducted in a time period that can be in a range from about 30 seconds to about 18 hours, such as, for example, from about 1 minute to about 1 hour, from about 5 minutes to about 15 hours, from about 5 minutes to about 8 hours, from about 10 minutes to about 5 hours, from about 30 minutes to about 6 hours, from about 30 minutes to about 3 hours, or from about 1 hour to about 5 hours, and the like.

In one aspect, fluoriding of the calcined supported chromium catalyst can be performed in an ambient atmosphere (e.g., an oxidizing atmosphere), for example, a dry ambient atmosphere. Hence, the vapor employed in the fluoriding step can comprise a fluorine-containing compound and air, a fluorine-containing compound and a mixture of oxygen and air, a fluorine-containing compound and mixture of oxygen and an inert gas, and so forth. Similar to the gas stream employed in the calcining step, the vapor used in the fluoriding step can contain any reasonable mole % of oxygen, but typical ranges can include from about 0.1 to about 25 mole %, from about 1 to about 21 mole %, from about 2 to about 21 mole %, from about 1 to about 10 mole %, from about 15 to about 25 mole %, or from about 5 to about 15 mole %, and the like.

In another aspect, fluoriding of the calcined supported chromium catalyst can be performed in an inert atmosphere. Hence, in addition to the fluorine-containing compound, the vapor can comprise (or consist essentially of, or consist of) an inert gas. The inert gas can be helium, neon, argon, nitrogen, carbon dioxide, and the like, and this includes combination of two or more of these materials.

In these and other aspects, the amount of the fluorine-containing compound in the vapor stream contacting the calcined supported chromium catalyst can be at least about 10 ppmv (ppm by volume), at least 100 ppmv, or at least 1% by volume. In some aspects, the fluorine-containing compound can represent substantially the entire vapor stream contacting the calcined supported chromium catalyst. More often, however, the amount of the fluorine-containing compound in the vapor stream contacting the calcined supported chromium catalyst can be less than about 20%, less than about 10%, or less than about 5%, by volume. Accordingly, representative ranges for the amount of the fluorine-containing compound in the vapor include from about 100 ppmv to about 20 volume %, or from about 1000 ppmv to about 10 volume %.

In one aspect, the fluorine-containing compound can be present in the vapor stream throughout the duration of the fluoriding step. For instance, about 25 ppmv, or about 100 ppmv, of the fluorine-containing compound in a stream of dry air can be contacted with the calcined supported chromium catalyst at a particular peak fluoriding temperature (e.g., in the 300° C. to 500° C. range) and for a particular duration of the fluoriding step (e.g., in the 10 minute to 5 hour range). In another aspect, the fluorine-containing compound can be present in the vapor stream for only a portion of the duration of the fluoriding step, e.g., less than about 15 minutes. For instance, about 1% by volume, or about 5% by volume, of the fluorine-containing compound in a stream of dry air can be contacted with the calcined supported chromium catalyst at a particular peak fluoriding temperature (e.g., in the 300° C. to 500° C. range) and for a particular portion of the duration of the fluoriding step (e.g., 15 seconds, 30 seconds, 1 minute, 5 minutes, etc.). For the remainder of the duration of the fluoriding step (e.g., total of 10 min, total of 2 hours, etc.), the vapor stream can contain only the dry air. Thus, the fluorine-containing compound can be present in the vapor stream for as little as about 15-30 seconds to as long as the complete duration of the fluoriding step. Often, the fluorine-containing compound can be present in the vapor stream for a period of time sufficient to result in a desired F loading on the fluorided solid oxide, and typically, is not oversupplied above that required to retain greater than about 95% of the F on the fluorided chromium catalyst (e.g., 99-100% by weight). Therefore, as a fraction of the fluoriding time or duration of the fluoriding step, the fluorine-containing compound can be present in the vapor for less than about 25%, for less than about 10%, or for less than about 5%, of the total fluoriding time or duration of the fluoriding (or contacting) step.

The fluorine-containing compound, in certain aspects, can comprise (i) a fluoroalkane or fluoroalkene of the formula CxHyFz, wherein x is an integer from 1 to 8, y and z are integers such that y+z=2x+n, and wherein n is 0 or 2; (ii) a fluoroaromatic compound (e.g., benzene, toluene, xylene, etc.), wherein at least one hydrogen atom is replaced with a F atom; or (iii) an alkyl or alkenyl ether wherein at least one alkyl or alkenyl group has a hydrogen atom replaced with a F atom; or any combination thereof.

In other aspects, the fluorine-containing compound can comprise a Freon or a fluorocarbon compound. For instance, suitable fluorine-containing compounds can include, but are not limited to, tetrafluoromethane, trifluoromethane, difluoromethane, fluoromethane, hexafluoroethane, pentafluoroethane, pentafluorodimethyl ether, 1,1,2,2-tetrafluoroethane, 1,1,1,2-tetrafluoroethane, bis(difluoromethyl)ether, 1,1,2-trifluoroethane, 1,1,1-trifluoroethane, methyl trifluoromethyl ether, 2,2,2-trifluoroethyl methyl ether, 1,2-difluoroethane, 1,1-difluoroethane, fluoroethane, octafluoropropane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, pentafluoropropane, 1,1,2,2,3-pentafluoropropane, 1,1,2,3,3-pentafluoropropane, 1,1,1,2,3-pentafluoropropane, 1,1,1,3,3-pentafluoropropane, methyl pentafluoroethyl ether, difluoromethyl 2,2,2-trifluoroethyl ether, difluoromethyl 1,1,2-trifluoroethyl ether, 1,1,2,2-tetrafluoropropane, methyl 1,1,2,2-tetrafluoroethyl ether, trifluoropropane, difluoropropane, fluoropropane, octafluorocyclobutane, decafluorobutane, 1,1,1,2,2,3,3,4,4-nonafluorobutane, 1,1,1,2,3,4,4,4-octafluorobutane, 1,1,1,2,2,3,3-heptafluorobutane, perfluoropropyl methyl ether, perfluoroisopropyl methyl ether, 1,1,1,3,3-pentafluorobutane, perfluorohexane (tetradecafluorohexane), tetrafluoroethylene, 1,1-difluoroethyl ene, fluoroethylene, hexafluoropropylene, 2,3,3,3-tetrafluoropropene, hexafluoropropene trimer, and the like, as well as combinations thereof.

In another aspect, the fluorine-containing compound can comprise (or consist essentially of, or consist of) tetrafluoromethane, trifluoromethane, difluoromethane, fluoromethane, hexafluoroethane, pentafluoroethane, tetrafluoroethane, trifluoroethane, difluorethane, octafluoropropane, perfluorohexane, perfluorobenzene, pentafluorodimethyl ether, bis(difluoromethyl)ether, methyl trifluoromethyl ether, trifluoroethyl methyl ether, perfluoroacetic anhydride, trifluoroethanol, silicon tetrafluoride (SiF$_4$), hydrogen fluoride (HF), fluorine gas (F$_2$), boron trifluoride (BF$_3$), and the like, as well as mixtures or combinations thereof. In yet another aspect, the fluorine-containing compound can comprise (or consist essentially of, or consist of) tetrafluoroethane, tetrafluoromethane, trifluoromethane, difluoromethane, perfluorohexane, hexafluoroethane, pentafluoroethane, pentafluorodimethyl ether, bis(difluoromethyl)ether, a trifluoroethane, a difluorethane, methyl trifluoromethyl ether, trifluoroethyl methyl ether, octafluoropropane, perfluoroacetic anhydride, perfluorobenzene, fluoromethane, trifluoroethanol, silicon tetrafluoride (SiF$_4$), hydrogen fluoride (HF), fluorine gas (F$_2$), and the like, as well as mixtures or combinations thereof. For instance, the fluorine-containing compound can comprise (or consist essentially of, or consist of) tetrafluoromethane; alternatively, trifluoromethane; alternatively, difluoromethane; alternatively, fluoromethane; alternatively, hexafluoroethane; alternatively, pentafluoroethane; alternatively, tetrafluoroethane; alternatively, trifluoroethane; alternatively, difluorethane; alternatively, octafluoropropane; alternatively, perfluorohexane; alternatively, perfluorobenzene; alternatively, pentafluorodimethyl ether; alternatively, bis(difluoromethyl)ether; alternatively, methyl trifluoromethyl ether; alternatively, trifluoroethyl methyl ether; alternatively, perfluoroacetic anhydride; alternatively, trifluoroethanol; alternatively, silicon tetrafluoride; alternatively, hydrogen fluoride; or alternatively, fluorine gas.

In some aspects, the fluorine-containing compound can comprise tetrafluoroethane, perfluorohexane, perfluoroacetic anhydride, and the like, or any combination thereof, while in other aspects, the fluorine-containing compound can comprise tetrafluoroethane, or alternatively, the fluorine-containing compound can comprise perfluorohexane.

In step (a), any suitable supported chromium catalyst can be calcined at the peak calcining temperature to produce the calcined supported chromium catalyst, and in step (b), the calcined supported chromium catalyst can be contacted at a peak fluoriding temperature with a vapor comprising a fluorine-containing compound to produce any suitable fluorided chromium catalyst. The supported chromium catalyst and/or the fluorided chromium catalyst can comprise chromium supported on any suitable solid oxide, non-limiting examples of which can include silica, alumina, titania, zirconia, magnesia, boria, zinc oxide, and the like, including mixed oxides thereof, and any combinations thereof. Examples of mixed oxides that can be used to form a chromium catalyst can include, but are not limited to, silica-alumina, silica-titania, silica-titania-magnesia, silica-zirconia, alumina-titania, alumina-zirconia, zinc-aluminate, alumina-boria, silica-boria, aluminophosphate-silica, titania-zirconia, and the like, as well as combinations thereof. For instance, the solid oxide can comprise silica-titania, silica-titania-magnesia, or silica-alumina, either singly or in any combination.

The supported chromium catalyst that can be used in this invention, therefore, can comprise chromium/silica, chromium/silica-titania, chromium/silica-titania-magnesia, chromium/silica-alumina, chromium/alumina, chromium/phosphated alumina, and the like, as well as combinations thereof. In one aspect, the supported chromium catalyst can comprise chromium/silica, while in another aspect, the supported chromium catalyst can comprise chromium/silica-titania, and in yet another aspect, the supported chromium catalyst can comprise chromium/silica-titania-magnesia. Such supported chromium catalysts are commercially available, as would be readily recognized by those of skill in the art.

Likewise, the fluorided chromium catalyst that can be produced in accordance with this invention can comprise, for example, fluorided chromium/silica, fluorided chromium/silica-titania, fluorided chromium/silica-titania-magnesia, fluorided chromium/silica-alumina, fluorided chromium/alumina, fluorided chromium/phosphated alumina, and the like, as well as combinations thereof. In one aspect, the fluorided chromium catalyst can comprise fluorided chromium/silica, while in another aspect, the fluorided chromium catalyst can comprise fluorided chromium/silica-titania.

The supported chromium catalyst and/or the fluorided chromium catalyst often can contain from about 0.1 to about 10 wt. % chromium, based on the total weight of the catalyst. Other suitable ranges can include from about 0.1 to about 5 wt. %, from about 0.5 to about 3 wt. %, from about 1 to about 4 wt. %, or from about 0.5 to about 2.5 wt. %, of chromium, based on the total weight of the catalyst.

The fluorided chromium catalyst generally can contain from about 0.1 to about 12 wt. % fluorine (F), based on the total weight of the fluorided chromium catalyst. In particular aspects provided herein, the fluorided chromium catalyst can contain from about 0.1 to about 10 wt. % fluorine, from about 0.25 to about 8 wt. % fluorine, from about 0.25 to about 5 wt. % fluorine, from about 0.5 to about 5 wt. % fluorine, or from about 1 to about 4 wt. % fluorine, based on the total weight of the fluorided chromium catalyst.

In various aspects contemplated herein, the processes for producing a fluorided chromium catalyst can be performed with a higher temperature calcination followed by a lower temperature fluorination. While not wishing to be bound by theory, it is believed that calcining the supported chromium catalyst first at a higher temperature is beneficial to activate the hexavalent chromium, garner higher catalyst activity, and increase the melt index potential of the catalyst, followed by a lower temperature fluorination step to result in a fluorided chromium catalyst with the benefits of fluorine on the catalyst without sacrificing catalyst activity and reductions in catalyst pore volume and/or surface area. For instance, the fluorided chromium catalyst allows the production of polymers having a greater range of melt indices and molecular weight distributions, as well as lower amounts of long chain branches, than can be achieved without fluorine addition as described herein.

Accordingly, in one aspect of this invention, the peak fluoriding temperature can be at least about 50° C. less than the peak calcining temperature. In another aspect, the peak fluoriding temperature can be at least about 75° C., at least about 100° C., at least about 125° C., at least about 150° C., or at least about 200° C., less than the peak calcining temperature. In yet another aspect, the peak fluoriding temperature can be from about 50° C. to about 600° C. less than the peak calcining temperature, or from about 75° C. to about 600° C. less than the peak calcining temperature. In still another aspect, the peak fluoriding temperature can be from about 75° C. to about 500° C., from about 100° C. to about 600° C., from about 150° C. to about 500° C., from about 200° C. to about 600° C., from about 200° C. to about 500° C., or from about 250° C. to about 450° C., less than the peak calcining temperature. For instance, representative and non-limiting examples of the peak calcining temperature and the peak fluoriding temperature can include the following: a peak calcining temperature of 800° C. and a peak fluoriding temperature of 400° C., a peak calcining temperature of 800° C. and a peak fluoriding temperature of 500° C., a peak calcining temperature of 850° C. and a peak fluoriding temperature of 450° C., a peak calcining temperature of 750° C. and a peak fluoriding temperature of 425° C., or a peak calcining temperature of 871° C. and a peak fluoriding temperature of 400° C., and the like.

Fluorided chromium catalysts of the present invention generally can have total pore volumes (determined using the t-plot method) of at least about 0.5 mL/g, and more often, at least about 1 mL/g. For instance, typical ranges of total pore volume for fluorided chromium catalysts produced using the processes disclosed herein can include, but are not limited to, the following ranges: from about 0.5 to about 5 mL/g, from about 1 to about 5 mL/g, from about 1 to about 3 mL/g, from about 1.2 to about 4 mL/g, or from about 1.2 to about 2.5 mL/g, and the like.

Additionally or alternatively, the fluorided chromium catalysts generally can have surface areas (BET surface areas determined using the BET method) of at least about 200 $m^2/g$, and more often, at least about 250 $m^2/g$. For instance, typical ranges of surface area for fluorided chromium catalysts produced using the processes disclosed herein can include, but are not limited to, the following ranges: from about 200 to about 700 $m^2/g$, from about 200 to about 550 $m^2/g$, from about 250 to about 550 $m^2/g$, from about 250 to about 500 $m^2/g$, from about 275 to about 525 $m^2/g$, or from about 300 to about 600 $m^2/g$, and the like.

In a particular aspect, the surface area of the fluorided chromium catalyst produced by the processes disclosed herein (e.g., with a peak fluoriding temperature of least about 50° C. less than the peak calcining temperature, from about 200° C. to about 500° C. less, and so forth) can be at least about 5% greater than a surface area of a fluorided chromium catalyst obtained by performing the contacting step (fluoriding step) at the peak calcining temperature, instead of at the peak fluoriding temperature. In this aspect, any other conditions used to produce the fluorided chromium catalyst are to be held constant for this comparison, e.g., same calcining time, same calcining atmosphere, same contacting/fluoriding time, etc. Hence, the processes disclosed herein can provide fluorided chromium catalysts with higher surface areas than processes in which the peak fluoriding temperature is not at least 50° C. less (or from about 200° C. to about 500° C. less, and so forth) than the peak calcining temperature. Generally, the surface area of the fluorided chromium catalyst produced by the process disclosed herein (at a peak calcination temperature of X, and peak fluoriding temperature at least 50° C. less than X) can be at least about 5% greater than the surface area of a fluorided chromium catalyst obtained by performing the contacting step (fluoriding step) at the same peak calcining temperature of X, but in some aspects, the surface area can be at least about 10% greater, at least about 15% greater, at least about 25% greater, at least about 50% greater, at least about 100% greater, and often with no upper limit, such as from about 5-1000% greater, about 25-500% greater, or about 50-250% greater.

In these and other aspects, the fluorided chromium catalysts disclosed herein generally can have any suitable average particle size, often ranging from about 10 microns to about 200 microns, from about 25 microns to about 150 microns, or from about 40 to about 120 microns. Moreover, the fluorided chromium catalyst can be an orange color, typically representative of hexavalent chromium (Cr(VI)), as opposed to a green color, typically representative of Cr(III).

An illustrative and non-limiting example of a fluorided chromium catalyst in accordance with this invention is a fluorided chromium/silica catalyst. The fluorided chromium/silica catalyst can contain from about 0.5 to about 5 wt. % chromium (or from about 1 to about 4 wt. % chromium, or from about 0.5 to about 2.5 wt. % chromium) and from about 0.5 to about 5 wt. % fluorine (or from about 0.5 to about 4.5 wt. % fluorine, or from about 1 to about 4 wt. % fluorine), and the fluorided chromium/silica catalyst can be characterized by a surface area in a range from about 200 to about 700 $m^2/g$ (or from about 250 to about 550 $m^2/g$, or from about 275 to about 525 $m^2/g$), and wherein from about 40 to 100% of the chromium (by weight) can be present as Cr(VI). In some aspects, the weight percent of the chromium present as Cr(VI) can range from about 50 to about 100%, from about 60 to about 100%, from about 40 to about 95%, from about 50 to about 95%, from about 60 to about 95%, from about 50 to about 90%, or from about 60 to about 90%. Additionally, the fluorided chromium/silica catalyst can be orange in color.

Another illustrative and non-limiting example of a fluorided chromium catalyst in accordance with this invention is a fluorided chromium/silica-titania catalyst. The fluorided chromium/silica-titania catalyst can contain from about 0.5 to about 5 wt. % chromium (or from about 1 to about 4 wt. % chromium, or from about 0.5 to about 2.5 wt. % chromium) and from about 0.5 to about 5 wt. % fluorine (or from about 0.5 to about 4.5 wt. % fluorine, or from about 1 to about 4 wt. % fluorine), and the fluorided chromium/silica-titania catalyst can be characterized by a surface area in a range from about 200 to about 700 $m^2/g$ (or from about 300 to about 700 $m^2/g$, or from about 300 to about 600 $m^2/g$), and wherein from about 40 to 100% of the chromium (by weight) can be present as Cr(VI). In some aspects, the weight percent of the chromium present as Cr(VI) can range from about 50 to about 100%, from about 60 to about 100%, from about 40 to about 95%, from about 50 to about 95%, from about 60 to about 95%, from about 50 to about 90%, or from about 60 to about 90%. Additionally, the fluorided chromium/silica-titania catalyst can be orange in color.

In various aspects contemplated herein, the processes for producing a fluorided chromium catalyst can further include an optional step performed after the fluoriding step. As a non-limiting example, a reducing step can be performed after the fluoriding step, and this reducing step can comprise contacting the fluorided chromium catalyst with a reducing gas stream comprising (or consisting essentially of, or consisting of) carbon monoxide under conditions sufficient to change an oxidation state of at least a portion of the chromium to divalent chromium. Generally, a change to divalent chromium (Cr(II)) results in a blue color.

Various temperature and time conditions can be employed in this optional reducing step. Illustrative reducing temperatures often fall within a range from about 200° C. to about 600° C., from about 250° C. to about 550° C., or from about 300° C. to about 500° C., and the like. Typical reducing time periods can range from about 5 minutes to about 15 hours, from about 5 minutes to about 8 hours, or from about 10 minutes to about 5 hours, and the like.

Co-Catalysts

The catalyst compositions and/or polymerization processes disclosed herein generally can employ a co-catalyst. In some aspects, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth, and in which the metal can be any suitable metal, often a group 13 metal. Hence, the metal can be boron or aluminum in certain aspects of this invention, and the co-catalyst can comprise a boron hydrocarbyl or alkyl, or an aluminum hydrocarbyl or alkyl, as well as combinations thereof.

In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butyl aluminoxane, sec-butylaluminoxane, iso-butylaluminoxane, 1-pentyl-aluminoxane, 2-pentylaluminoxane, 3-pentyl aluminoxane, isopentylaluminoxane, neopentylaluminoxane, and the like, or any combination thereof. Representative and non-limiting examples of organoaluminums include trimethylaluminum, triethylaluminum, tri-n-propylaluminum, tri-n-butylaluminum, tri-isobutylaluminum, tri-n-hexylaluminum, tri-n-octylaluminum, diisobutyl aluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used in the catalyst compositions of this invention are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent, based on the total weight of the monomer and comonomer. According to another aspect of the present invention, the amount of comonomer introduced into a polymerization reactor system can be from about 0.01 to about 40 weight percent comonomer, based on the total weight of the monomer and comonomer, or alternatively, from about 0.1 to about 35 weight percent comonomer, or from about 0.5 to about 20 weight percent comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Polymerization Processes

Fluorided chromium catalysts and related catalyst compositions of the present invention can be used to polymerize olefins to form homopolymers, copolymers, terpolymers, and the like. One such process for polymerizing olefins can comprise contacting any fluorided chromium catalyst disclosed herein (e.g., produced by any process to produce a fluorided chromium catalyst disclosed herein) and an optional co-catalyst with an olefin monomer and an optional olefin comonomer in a polymerization reactor system under polymerization conditions to produce an olefin polymer. Suitable fluorided chromium catalysts and co-catalysts are discussed herein.

In accordance with aspects of this invention, and unexpectedly, the catalyst activity of (or a catalyst system containing) the fluorided chromium catalyst produced by the processes disclosed herein (e.g., with a peak fluoriding temperature of least about 50° C. less than the peak calcining temperature, from about 200° C. to about 500° C. less, and so forth) can be at least about 5% greater than that of (a similar catalyst system containing) a fluorided chromium catalyst obtained by performing the contacting step (fluoriding step) at the same peak calcining temperature, instead of at the peak fluoriding temperature. In this aspect, any other conditions used to produce the fluorided chromium catalyst and any polymerization conditions used to produce the polymer are to be held constant for this comparison, e.g., same calcining time, same calcining atmosphere, same contacting/fluoriding time, same polymerization temperature, same catalyst loading, and monomer amount, etc. For instance, the conditions can be as described in Examples 1-23 that follow. Hence, the only difference is the method used to produce the fluorided chromium catalyst, i.e., fluoriding at a lower peak fluoriding temperature versus fluoriding at the peak calcining temperature.

Hence, the processes disclosed herein can provide fluorided chromium catalysts with higher catalyst activities than processes in which the peak fluoriding temperature is not at least 50° C. less (or from about 200° C. to about 500° C. less, and so forth) than the peak calcining temperature. Generally, the catalyst activity of the fluorided chromium catalyst produced by the processes disclosed herein (at a peak calcination temperature of X, and peak fluoriding temperature at least 50° C. less than X) can be at least about 5% greater than the catalyst activity of a fluorided chromium catalyst obtained by performing the contacting step (fluoriding step) at the same peak calcining temperature of X, but in some aspects, the catalyst activity can be at least about 10% greater, at least about 20% greater, at least about 30% greater, at least about 50% greater, at least about 100% greater, and often with no upper limit, such as from about 5-1000% greater, about 25-500% greater, or about 50-250% greater.

The fluorided chromium catalysts of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under polymerization conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 70° C. to about 115° C., from about 80° C. to about 110° C., or from about 75° C. to about 105° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

Aspects of this invention also are directed to olefin polymerization processes conducted in the absence of added hydrogen. An olefin polymerization process of this invention can comprise contacting a fluorided chromium catalyst and an optional co-catalyst with an olefin monomer and optionally an olefin comonomer in a polymerization reactor system under polymerization conditions to produce an olefin polymer, and wherein the polymerization process is conducted in the absence of added hydrogen (no hydrogen is added to the polymerization reactor system). As one of ordinary skill in the art would recognize, hydrogen can be generated in-situ by certain catalyst systems in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a fluorided chromium catalyst and an optional co-catalyst with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The amount of hydrogen added (based on the amount of olefin monomer) to the process can be controlled at a molar percentage which generally falls within a range from about 0.05 to about 20 mole %, from about 0.1 to about 15 mole %, from about 0.25 to about 10 mole %, or from about 0.5 to about 10 mole %. In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio, and maintained at the ratio to within about +/−25% during the polymerization run. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

The olefin polymers (e.g., ethylene homopolymers, ethylene copolymers, etc.) produced by the olefin polymerization processes of this invention can have any of the polymer properties disclosed herein, for example, a high load melt index (HLMI) from about 1 to about 80 g/10 min (or from about 2 to about 70 g/10 min), and/or a density from about 0.90 to about 0.97 g/cm$^3$ (or from about 0.92 to about 0.96 g/cm$^3$), and/or a ratio of Mw/Mn from about 5 to about 30 (or from about 6 to about 25), and/or a ratio of Mz/Mw from about 5 to about 14 (or from about 6 to about 12), and/or less than or equal to about 15 LCB's per 1,000,000 total carbon atoms (or less than or equal to about 10 LCB's), and/or a conventional comonomer distribution.

Unexpectedly, the olefin polymers produced by the polymerization processes of this invention can have a lower HLMI, and/or less long chain branching, and/or a higher ratio of Mw/Mn, and/or a higher ratio of $I_{21}/I_{10}$ (independently, by at least about 5%, at least about 10%, at least about 15%, or at least about 20%, and often up to about 50%, up to about 75%, or up to about 90%) than that of an olefin polymer obtained without using step (b) of the process to produce the fluorided chromium catalyst, when compared under the same polymerization conditions. Any other conditions used to produce the catalysts and any polymerization conditions used to produce the polymer are to be held constant for this comparison, e.g., same calcining time, same calcining atmosphere, same polymerization temperature, same catalyst loading, same monomer amount, etc. For instance, the conditions can be as described in Examples 1-23 that follow. Hence, the only difference is the method used to produce the chromium catalyst, i.e., fluorided chromium catalyst, versus a chromium catalyst in which no fluoriding step has been used.

Also unexpectedly, the olefin polymers produced by the polymerization processes of this invention can have a higher HLMI, and/or less long chain branching, and/or a lower ratio of Mw/Mn (independently, by at least about 5%, at least about 10%, at least about 15%, or at least about 25%, and often up to about 50%, up to about 200%, up to about 700%, or up to about 1000%) than that of an olefin polymer obtained by using a fluorided chromium catalyst activated at a temperature of about 650-700° C. (representative of a temperature below the sintering temperature, and often above the peak fluoriding temperature), when compared under the same polymerization conditions. As above, all other catalyst preparation and polymerizations conditions are held constant, and the conditions can be as described in Examples 1-23 that follow. Hence, the only difference is the method used to produce the chromium catalyst, i.e., a fluorided chromium catalyst produced using a high temperature calcination step, followed by a lower temperature fluoriding step, versus a fluorided chromium catalyst activated in a single step at a temperature of about 650-700° C.

This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

Ethylene polymers produced in accordance with this invention can have a high load melt index (HLMI) of less than or equal to about 200, less than or equal to about 150, or less than or equal to about 100 g/10 min. Suitable ranges for the HLMI can include, but are not limited to, from 0 to about 150, from about 0.5 to about 100, from about 1 to about 100, from about 1 to about 80, from about 1 to about 60, from about 2 to about 100, from about 2 to about 70, from about 3 to about 80, from about 3 to about 70, or from about 3 to about 60 g/10 min.

The densities of ethylene-based polymers produced using the fluorided chromium catalysts and the processes disclosed herein often are greater than or equal to about 0.89 g/cm$^3$. In one aspect of this invention, the density of the ethylene polymer can be in a range from about 0.90 to about 0.97 g/cm$^3$. Yet, in another aspect, the density can be in a range from about 0.91 to about 0.96 g/cm$^3$, such as, for example, from about 0.92 to about 0.96 g/cm$^3$, from about 0.93 to about 0.955 g/cm$^3$, or from about 0.94 to about 0.955 g/cm$^3$.

In an aspect, ethylene polymers described herein can have a ratio of Mw/Mn, or the polydispersity index, of greater than or equal to about 5, greater than or equal to about 6, or greater than or equal to about 7. Often, the Mw/Mn can range up to about 30-40, therefore, non-limiting ranges for Mw/Mn include from about 5 to about 40, from about 5 to about 30, from about 5 to about 20, from about 6 to about 35, from about 6 to about 30, from about 6 to about 25, from about 6 to about 20, from about 7 to about 40, from about 7 to about 30, or from about 7 to about 20.

In an aspect, ethylene polymers described herein can have a ratio of Mz/Mw in a range from about 4 to about 15, from about 4 to about 12, from about 5 to about 14, from about 5 to about 12, or from about 5 to about 10. In another aspect, ethylene polymers described herein can have a Mz/Mw in a range from about 6 to about 15, from about 6 to about 14, from about 6 to about 12, or from about 7 to about 10.

Generally, polymers produced in aspects of the present invention have low levels of long chain branching, with typically less than or equal to about 15 long chain branches (LCB's) per 1,000,000 total carbon atoms, and more often, less than or equal to about 10 LCB's per 1,000,000 total carbon atoms, less than or equal to about 8 LCB's per 1,000,000 total carbon atoms, or less than or equal to about 5 LCB's per 1,000,000 total carbon atoms, as determined by the Janzen-Colby method as described in *J. Mol. Struct.*, 485/486, 569-584 (1999); see also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety.

Ethylene copolymers, for example, produced using the polymerization processes and catalyst systems described hereinabove can, in some aspects, have a conventional comonomer distribution; generally, the lower molecular weight components of the polymer have higher comonomer incorporation than the higher molecular weight components. Typically, there is decreasing comonomer incorporation with increasing molecular weight. In one aspect, the number of short chain branches (SCB) per 1000 total carbon atoms of the polymer can be greater at Mn than at Mz. In another aspect, the number of SCB per 1000 total carbon atoms of the polymer can be greater at Mn than at Mw.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Also contemplated herein is a method for forming or preparing an article of manufacture comprising a polymer produced by any of the polymerization processes disclosed herein. For instance, a method can comprise (i) contacting a fluorided chromium catalyst (e.g., produced as described herein) and an optional co-catalyst with an olefin monomer and an optional olefin comonomer under polymerization conditions in a polymerization reactor system to produce an olefin polymer; and (ii) forming an article of manufacture comprising the olefin polymer (e.g., having any of the polymer properties disclosed herein). The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2.16 kg weight, $I_{10}$ (g/10 min) was determined in accordance with ASTM D1238 at 190° C. with a 10 kg weight, and high load melt index (HLMI, $I_{21}$, g/10 min) was determined in accordance with ASTM D1238 at 190° C. with a 21.6 kg weight.

Polymer density can be determined in grams per cubic centimeter (g/cm$^3$) on a compression molded sample, cooled at about 15° C. per hour, and conditioned for about 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemicals Company's HDPE polyethylene resin, MAR-LEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$r_\eta$, and the breadth parameter—a. The simplified Carreau-Yasuda (CY) empirical model is as follows.

$$|\eta*(\omega)| = \frac{\eta_0}{[1 + (\tau_\eta \omega)^a]^{(1-n)/a}},$$

wherein: |η*(ω))|=magnitude of complex shear viscosity;
$\eta_0$=zero shear viscosity;
$\tau_\eta$=viscous relaxation time;
α="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

The long chain branches (LCB) per 1,000,000 total carbon atoms were calculated using the method of Janzen and Colby (*J. Mol. Struct.*, 485/486, 569-584 (1999)), from values of zero shear viscosity, $r_{ic}$, (determined from the Carreau-Yasuda model, described hereinabove), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety.

Short chain branch content and short chain branching distribution (SCBD) across the molecular weight distribution can be determined via an IR5-detected GPC system (IR5-GPC), wherein the GPC system is a PL220 GPC/SEC system (Polymer Labs, an Agilent company) equipped with three Styragel HMW-6E columns (Waters, Mass.) for polymer separation. A thermoelectric-cooled IR5 MCT detector (IR5) (Polymer Char, Spain) is connected to the GPC columns via a hot-transfer line. Chromatographic data is obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions can be set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell are set at 150° C., while the temperature of the electronics of the IR5 detector is set at 60° C. Short chain branching content can be determined via an in-house method using the intensity ratio of $CH_3$ ($I_{CH3}$) to $CH_2$ ($I_{CH2}$) coupled with a calibration curve. The calibration curve is a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) are used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution are obtained for resins fractionated by the IR5-GPC system under exactly the same chromatographic conditions as for these SCB standards. A relationship between the intensity ratio and the elution volume is converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Examples 1-23

In these examples, several commercially-available chromium catalysts were evaluated. MAGNAPORE 963 (Mag 963) is a Cr/silica-titania catalyst available from W.R. Grace, and has 1 wt. % Cr, a surface area of 500 m$^2$/g, and a pore volume of 2.3 mL/g. HA30W is a Cr/silica catalyst available from W.R. Grace, and has 1 wt. % Cr, a surface area of 500 m$^2$/g, and a pore volume of 1.5 mL/g. HA30WFL is a Cr/silica catalyst available from W.R. Grace, and has 1 wt. % Cr, 1.7 wt. % F, a surface area of 500 m$^2$/g, and a pore volume of 1.5 mL/g.

In Example 2 and Example 3, HA30WFL was calcined in dry air at 649° C. and 677° C., respectively, for 3 hours; the resultant activated catalysts were green. Similarly, HA30WFL was calcined in dry air for 3 hours at temperatures of 650° C., 675° C., 700° C., and 725° C., respectively, for Examples 20-23. In Examples 4-6 and Examples 7-9, HA30W was calcined in dry air at 650° C. and 800° C., respectively, for 3 hours; the resultant activated catalysts were orange. In Examples 14-15, Mag 963 was calcined in dry air at 871° C. for 3 hours; the resultant activated catalysts were orange.

For Examples 10-13, a sample of HA30W was placed in a quartz tube fitted with a sintered quartz distribution plate at the bottom. Dry air was then added from the bottom of the tube through the distribution plate to fluidize the supported chromium catalyst at a gas velocity of 0.1 ft/sec. The tube was placed in an electric furnace and the temperature was raised to a peak calcining temperature of 800° C., where it was held for 3 hours. Afterward, the temperature was reduced to a peak fluoriding temperature of 400° C. and stabilized, where the calcined supported chromium catalyst was fluorine treated by injection of tetrafluoroethane vapor in an amount to result in 2 wt. % fluorine, based on the total weight of fluorided chromium catalyst. The evaporation of the tetrafluoroethane into the dry air and impregnation of the catalyst took approximately 30 seconds. Then, the fluorided chromium catalyst (orange in color) was held at the peak fluoriding temperature for 10 minutes, cooled, and stored under dry nitrogen. The fluorided chromium catalysts of Examples 16-19 were prepared similarly, except that Mag 963 was used as the supported chromium catalyst, and the peak calcining temperature was 871° C.

The fluorided chromium catalyst of Example 1 was prepared by calcining HA30W at 650° C. in air for 3 hours. During the calcination, tetrafluoroethane was injected into the air source to equal 2 wt. % F on the final catalyst.

The chromium catalysts, prepared as described above, were used in polymerization experiments conducted in a 2.6-L stainless steel reactor. Isobutane (1.2 L) was used in all runs. Approximately 50-100 mg of the activated chromium catalyst was added through a charge port while slowly venting isobutane vapor. The charge port was closed and the isobutane was added. The contents of the reactor were stirred and heated to the desired run temperature of 100° C., and ethylene was then introduced into the reactor along with 5 mL of 1-hexene. Ethylene was fed on demand to maintain a reactor pressure of about 550 psig, and each polymerization run was stopped when the catalyst productivity had reached approximately 3,000 grams of ethylene/1-hexene copolymer per gram of the chromium catalyst (g/g).

Table I summarizes the chromium catalyst used, melt flow properties of the ethylene copolymer produced, and catalyst activities (g/g/hr) and productivities (g/g) relating to the polymerization experiments of Examples 1-19. Table II summarizes the molecular weight characterization of the ethylene copolymers of Examples 4-19; the molecular weights are in g/mol. Table III summarizes the chromium catalyst used, the HLMI (g/10 min), Mw (g/mol), and Mw/Mn of the ethylene copolymer produced, and catalyst activities (g/g/hr) and productivities (g/g) relating to the polymerization experiments of Examples 20-23.

As shown in Tables I-II and by Examples 14-19, the fluorided chromium catalyst unexpectedly resulted in ethylene polymers having a lower melt index, a lower HLMI, a higher melt flow ratio ($I_{21}/I_{10}$), a higher molecular weight (Mw, Mp), and a broader molecular weight distribution (Mw/Mn), as compared to polymers produced with the same supported chromium catalyst, but with no fluorine addition. FIG. 1 illustrates the molecular weight distributions (amount of polymer versus the logarithm of molecular weight) of the polymers of Example 15 (representative of Examples 14-15) and Example 19 (representative of Examples 16-19), and demonstrates the molecular weight differences.

Additionally, as shown in Tables I-II and by Examples 7-13, the fluorided chromium catalyst unexpectedly resulted in ethylene polymers having a lower melt index, a lower HLMI, a higher melt flow ratio ($I_{21}/I_{10}$), and a higher molecular weight (Mw, Mp), as compared to polymers produced with the same supported chromium catalyst and activated at the same 800° C. temperature, but with no fluorine addition.

Figure 2:
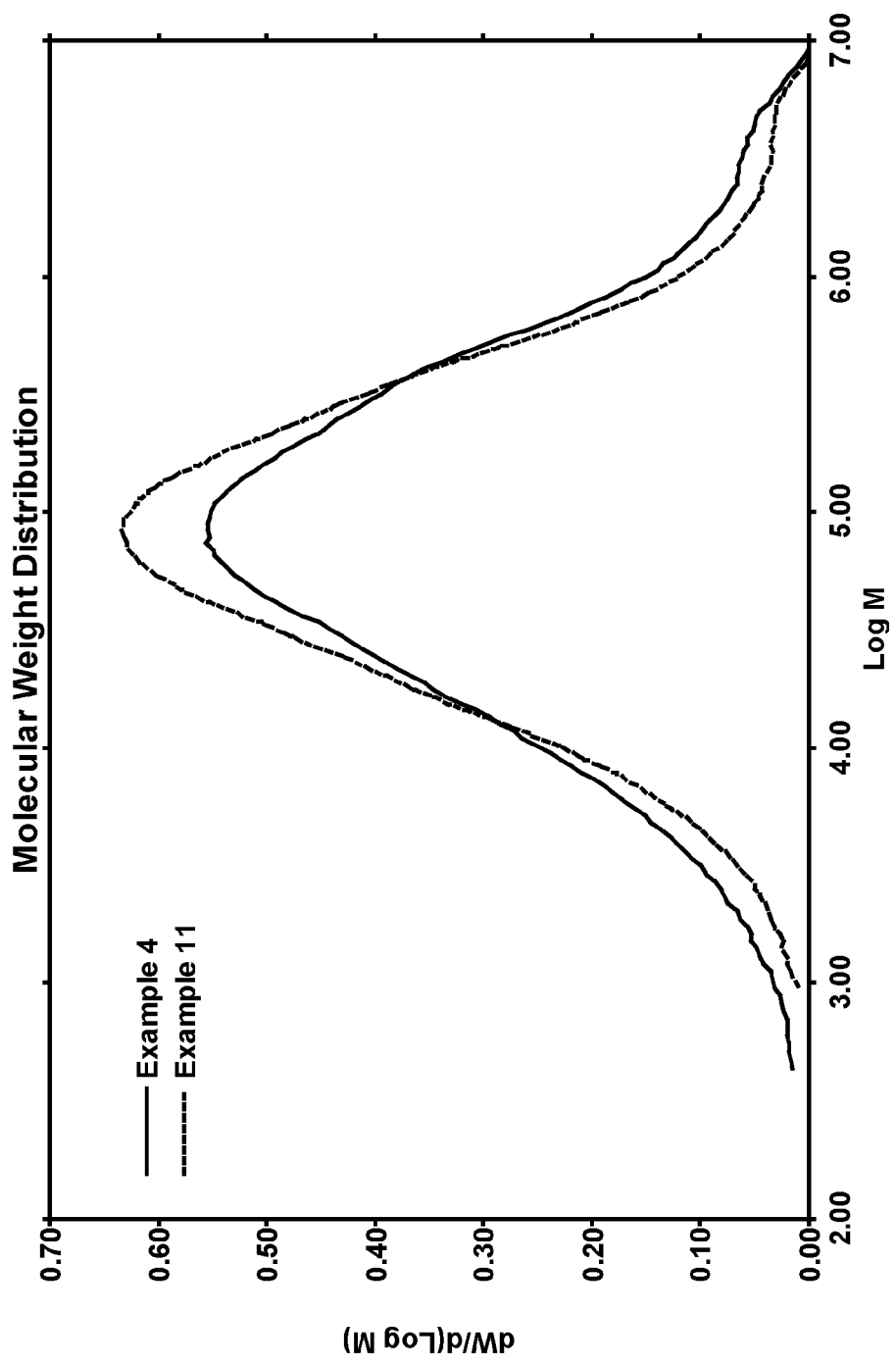
FIG. 2 presents a plot of the molecular weight distributions of the polymers of Examples 4 and 11.

Beneficially, as shown in Tables I-II and by Examples 4-6 and 10-13, the fluorided chromium catalyst unexpectedly resulted in ethylene polymers having a higher HLMI, a lower melt flow ratio ($I_{21}/I_{10}$), a lower molecular weight (Mw), and a narrower molecular weight distribution (Mw/Mn), as compared to polymers produced with the same supported chromium catalyst activated at a lower 650° C. temperature, but with no fluorine addition. Also beneficially, the fluorided chromium catalyst resulted in improved catalyst activity. FIG. 2 illustrates the molecular weight distributions (amount of polymer versus the logarithm of molecular weight) of the polymers of Example 4 (representative of Examples 4-6) and Example 11 (representative of Examples 10-13), and demonstrates the molecular weight differences.

In Tables I-III, Examples 1-3 and 20-23 demonstrate fluorided chromium catalysts produced by activating the catalyst after fluorine addition, whereas Examples 10-13 demonstrate fluorided chromium catalysts produced by activating the chromium catalyst first at a higher temperature, and then adding the fluorine and calcining at a lower temperature. The latter catalyst preparation procedure results in several surprising and beneficial results, for instance, ethylene polymers having a higher MI and HLMI (higher melt index potential), a lower molecular weight (Mw), and a narrower molecular weight distribution (Mw/Mn), as well as improved catalyst activity, as compared to polymers produced by activating the catalyst after fluorine addition. As shown by Example 23, there is a maximum temperature that can be used to activate a chromium catalyst after fluorine addition, due to sintering of the supported fluorided chromium catalyst, which drastically reduces catalyst surface area and pore volume, resulting in no catalytic activity.

Figure 3:
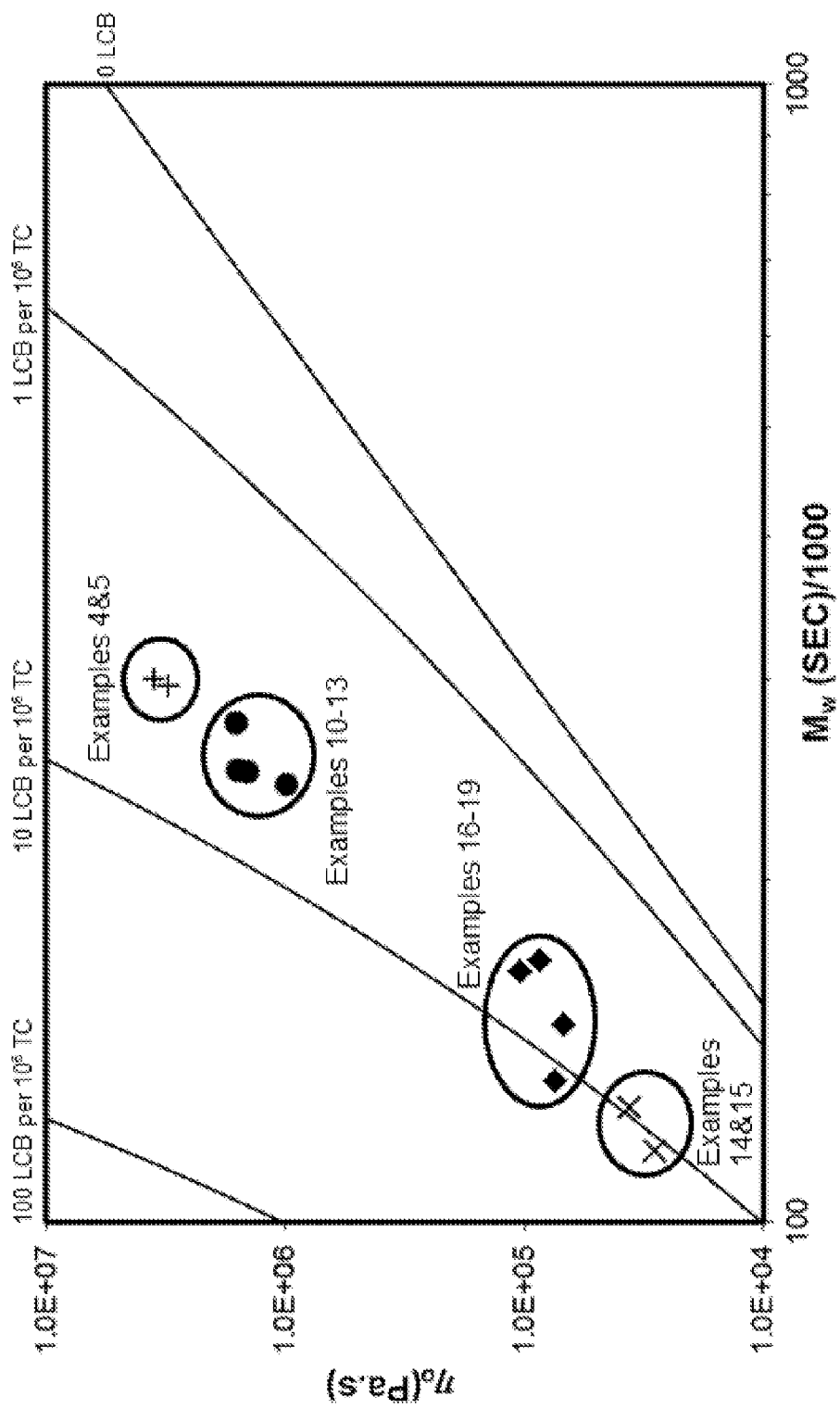
FIG. 3 presents a plot of the logarithm of the zero-shear viscosity versus the logarithm of weight-average molecular weight (Mw) for certain polymers in Table I and Table II, produced using different chromium catalysts.

FIG. 3 presents an "Arnett plot," wherein the log of the zero-shear viscosity is plotted against the log of the weight-average molecular weight. When each point is compared to the Janzen-Colby grid lines, the average number of long chain branches (LCB's) in the polymer can be determined. FIG. 3 shows the unexpectedly low levels of LCB's in the polymers produced using fluorided chromium catalysts, with generally less than or equal to about 10 LCB's per 1,000,000 total carbon atoms (TC). The fluorided Mag 963 catalysts (Examples 16-19) produced lower levels of LCB's than Mag 963 activated at the same temperature, but without fluorine treatment (Examples 14-15). Moreover, the HA30W activated at 800° C. and then fluorided at 400° C. (Examples 10-13) resulted in a very similar level of long chain branching as HA30W activated at 650° C., but without fluorine treatment (Examples 4-5). This is quite surprising, as the large increase in activation temperature would be expected to result in a significant increase in LCB's from the fluorided catalyst.

TABLE I

Examples 1-19.

| Example | Catalyst | Productivity | Activity | HLMI | MI | HLMI/I$_{10}$ |
|---|---|---|---|---|---|---|
| 1 | 2% F HA30W @ 650 | 2,400 | 7,990 | 1.3 | 0 | — |
| 2 | HA30WFL @ 649 | 2,650 | 5,300 | 1.3 | 0 | — |
| 3 | HA30WFL @ 677 | 2,790 | 6,430 | 1.6 | 0 | — |
| 4 | HA30W @ 650 | 2,900 | 6,200 | 4.2 | 0.09 | 4.7 |
| 5 | HA30W @ 650 | 2,810 | 6,480 | 4.0 | 0.01 | 4.5 |
| 6 | HA30W @ 650 | 2,810 | 5,610 | 4.0 | 0.10 | 5.2 |
| 7 | HA30W @ 800 | 2,700 | 8,510 | 16.3 | 0.48 | 3.7 |
| 8 | HA30W @ 800 | 3,310 | 7,940 | 16.7 | 0.37 | 3.9 |
| 9 | HA30W @ 800 | 3,210 | 9,640 | 16.8 | 0.48 | 3.6 |
| 10 | HA30W @ 800 + 2% F | 2,860 | 5,720 | 4.9 | 0.07 | 4.2 |
| 11 | HA30W @ 800 + 2% F | 2,980 | 7,150 | 7.1 | 0.12 | 4.1 |
| 12 | HA30W @ 800 + 2% F | 3,080 | 8,020 | 5.9 | 0.10 | 4.4 |
| 13 | HA30W @ 800 + 2% F | 2,930 | 7,340 | 6.2 | 0.07 | 4.4 |
| 14 | Mag 963 @ 871 | 3,360 | 12,580 | 107 | 3.8 | 3.6 |
| 15 | Mag 963 @ 871 | 3,340 | 14,430 | 126 | 5.1 | 3.4 |
| 16 | Mag 963 @ 871 + 2% F | 2,180 | 4,360 | 35.8 | 1.4 | 3.6 |
| 17 | Mag 963 @ 871 + 2% F | 3,150 | 7,000 | 38.1 | 1.4 | 3.5 |
| 18 | Mag 963 @ 871 + 2% F | 3,090 | 8,820 | 53.8 | 2.0 | 3.6 |
| 19 | Mag 963 @ 871 + 2% F | 3,160 | 10,520 | 55.3 | 1.9 | 3.7 |

TABLE II

Molecular Weight Characterization of Examples 4-19.

| Example | Catalyst | Mn/1000 | Mw/1000 | Mz/1000 | My/1000 | Mp/1000 | Mw/Mn | Mz/Mw |
|---|---|---|---|---|---|---|---|---|
| 4 | HA30W @ 650 | 16.9 | 296.3 | 2037.4 | 209.3 | 74.0 | 17.5 | 6.9 |
| 5 | HA30W @ 650 | 21.1 | 300.4 | 1848.6 | 216.7 | 84.0 | 14.2 | 6.2 |
| 6 | HA30W @ 650 | 18.2 | 291.1 | 1882.2 | 208.4 | 73.0 | 16.0 | 6.5 |
| 7 | HA30W @ 800 | 23.2 | 223.9 | 1783.8 | 160.8 | 56.0 | 9.7 | 8.0 |
| 8 | HA30W @ 800 | 19.4 | 210.9 | 1698.3 | 150.9 | 60.4 | 10.9 | 8.1 |
| 9 | HA30W @ 800 | 24.0 | 213.9 | 1603.7 | 155.1 | 56.0 | 8.9 | 7.5 |
| 10 | HA30W @ 800 + 2% F | 25.1 | 274.2 | 1918.6 | 198.7 | 94.3 | 10.9 | 7.0 |
| 11 | HA30W @ 800 + 2% F | 26.3 | 242.3 | 1687.0 | 177.6 | 83.0 | 9.2 | 7.0 |
| 12 | HA30W @ 800 + 2% F | 25.2 | 249.7 | 1633.9 | 183.5 | 88.4 | 9.9 | 6.5 |
| 13 | HA30W @ 800 + 2% F | 24.4 | 248.7 | 1567.7 | 183.7 | 81.9 | 10.2 | 6.3 |
| 14 | Mag 963 @ 871 | 13.3 | 126.2 | 1171.3 | 91.1 | 39.4 | 9.5 | 9.3 |
| 15 | Mag 963 @ 871 | 13.1 | 115.6 | 948.6 | 84.8 | 43.1 | 8.8 | 8.2 |
| 16 | Mag 963 @ 871 + 2% F | 12.3 | 166.2 | 1404.4 | 119.7 | 62.6 | 13.5 | 8.4 |
| 17 | Mag 963 @ 871 + 2% F | 12.0 | 169.9 | 1735.2 | 118.8 | 59.5 | 14.2 | 10.2 |
| 18 | Mag 963 @ 871 + 2% F | 11.4 | 149.0 | 1143.9 | 107.8 | 57.3 | 13.1 | 7.7 |
| 19 | Mag 963 @ 871 + 2% F | 12.4 | 133.3 | 852.5 | 98.9 | 54.4 | 10.7 | 6.4 |

TABLE III

Examples 20-23 - Impact of Activation Temperature.

| Example | Catalyst | Productivity | Activity | HLMI | Mw/1000 | Mw/Mn |
|---|---|---|---|---|---|---|
| 20 | HA30WFL @ 650 | 2,920 | 5,500 | 2.3 | 290 | 16 |
| 21 | HA30WFL @ 675 | 2,950 | 5,500 | 2.1 | 303 | 12 |
| 22 | HA30WFL @ 700 | 2,820 | 5,800 | 2.1 | 297 | 16 |
| 23 | HA30WFL @ 725 | 0 | 0 | — | — | — |

This invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A process to produce a fluorided chromium catalyst, the process comprising:

(a) calcining a supported chromium catalyst at a peak calcining temperature to produce a calcined supported chromium catalyst; and (b) contacting the calcined supported chromium catalyst at a peak fluoriding temperature with a vapor comprising a fluorine-containing compound to produce the fluorided chromium catalyst;

wherein the peak fluoriding temperature is at least about 50° C. less than the peak calcining temperature.

Embodiment 2

The process defined in embodiment 1, wherein the fluorine-containing compound comprises any suitable fluorine-containing compound, or any fluorine-containing compound disclosed herein, e.g., tetrafluoroethane, tetrafluoromethane, trifluoromethane, difluoromethane, perfluorohexane, hexafluoroethane, pentafluoroethane, pentafluorodimethyl ether, bis(difluoromethyl)ether, a trifluoroethane, a difluorethane, methyl trifluoromethyl ether, trifluoroethyl methyl ether, octafluoropropane, perfluoroacetic anhydride, perfluorobenzene, fluoromethane, trifluoroethanol, silicon tetrafluoride (SiF$_4$), hydrogen fluoride (HF), fluorine gas (F$_2$), or a combination thereof.

Embodiment 3

The process defined in embodiment 1, wherein the fluorine-containing compound comprises a fluorocarbon.

Embodiment 4

The process defined in embodiment 1, wherein the fluorine-containing compound comprises perfluorohexane, perfluoroacetic anhydride, tetrafluoroethane, or a combination thereof.

Embodiment 5

The process defined in embodiment 1, wherein the fluorine-containing compound comprises tetrafluoroethane.

Embodiment 6

The process defined in any one of the preceding embodiments, wherein the supported chromium catalyst (and/or the fluorided chromium catalyst) comprises chromium supported on any suitable solid oxide, or any solid oxide disclosed herein, e.g., silica, alumina, titania, zirconia, magnesia, boria, zinc oxide, any mixed oxide thereof, or any combination thereof.

Embodiment 7

The process defined in embodiment 6, wherein the solid oxide comprises silica-titania, silica-titania-magnesia, silica-alumina, or a combination thereof.

Embodiment 8

The process defined in any one of the preceding embodiments, wherein the supported chromium catalyst comprises any suitable supported chromium catalyst, or any supported chromium catalyst disclosed herein, e.g., chromium/silica, chromium/silica-titania, chromium/silica-titania-magnesia, chromium/silica-alumina, chromium/alumina, chromium/phosphated alumina, or a combination thereof.

Embodiment 9

The process defined in any one of the preceding embodiments, wherein the fluorided chromium catalyst comprises any suitable fluorided chromium catalyst, or any fluorided chromium catalyst disclosed herein, e.g., fluorided chromium/silica, fluorided chromium/silica-titania, fluorided chromium/silica-titania-magnesia, fluorided chromium/silica-alumina, fluorided chromium/alumina, fluorided chromium/phosphated alumina, or a combination thereof.

Embodiment 10

The process defined in any one of the preceding embodiments, wherein the supported chromium catalyst (and/or the fluorided chromium catalyst) comprises any suitable amount of chromium, or any amount disclosed herein, e.g., from about 0.1 to about 10 wt. %, from about 0.1 to about 5 wt. %, from about 1 to about 4 wt. %, or from about 0.5 to about 2.5 wt. % chromium, based on the weight of the catalyst.

Embodiment 11

The process defined in any one of the preceding embodiments, wherein the fluorided chromium catalyst comprises any suitable amount of fluorine, or any amount disclosed herein, e.g., from about 0.1 to about 10 wt. %, from about 0.25 to about 8 wt. %, from about 1 to about 4 wt. %, or from about 0.5 to about 5 wt. % fluorine, based on the weight of the fluorided chromium catalyst.

Embodiment 12

The process defined in any one of the preceding embodiments, wherein the peak fluoriding temperature is less than the peak calcining temperature by any suitable amount, or any amount disclosed herein, e.g., by at least about 100° C., by at least about 200° C., from about 50° C. to about 600° C. less, from about 75° C. to about 600° C. less, from about 75° C. to about 500° C. less, from about 100° C. to about 600° C. less, from about 200° C. to about 600° C. less, from about 200° C. to about 500° C. less, or from about 250° C. to about 450° C. less.

Embodiment 13

The process defined in any one of the preceding embodiments, wherein the peak calcining temperature is in any suitable range, or any range disclosed herein, e.g., from about 500° C. to about 900° C., from about 600° C. to about 871° C., from about 600° C. to about 850° C., from about 700° C. to about 850° C., from about 725° C. to about 900° C., from about 725° C. to about 871° C., from about 725° C. to about 850° C., from about 750° C. to about 871° C., or from about 750° C. to about 850° C.

Embodiment 14

The process defined in any one of the preceding embodiments, wherein the calcining in step (a) is performed for any suitable calcining time, or any calcining time disclosed herein, e.g., from about 1 to about 15 hours, from about 2 to about 12 hours, from about 3 to about 10 hours, or from about 5 to about 10 hours.

Embodiment 15

The process defined in any one of the preceding embodiments, wherein the calcining in step (a) is performed in an oxidizing atmosphere.

Embodiment 16

The process defined in any one of the preceding embodiments, wherein the peak fluoriding temperature is in any suitable range, or any range disclosed herein, e.g., from about 300° C. to about 675° C., from about 300° C. to about 650° C., from about 300° C. to about 500° C., from about 350° C. to about 500° C., from about 400° C. to about 600° C., or from about 400° C. to about 500° C.

Embodiment 17

The process defined in any one of the preceding embodiments, wherein the contacting in step (b) is performed for any suitable fluoriding time, or a fluoriding time in any range disclosed herein, e.g., from about 1 minute to about 15 hours, from about 5 minutes to about 8 hours, or from about 10 minutes to about 5 hours.

Embodiment 18

The process defined in embodiment 17, wherein the fluorine-containing compound is present in the vapor for any suitable fraction of the fluoriding time, or any fraction of the fluoriding time disclosed herein, e.g., less than about 25%, less than about 10%, or less than about 5%.

Embodiment 19

The process defined in any one of embodiments 1-18, wherein the contacting in step (b) is performed in an oxidizing atmosphere.

Embodiment 20

The process defined in any one of embodiments 1-18, wherein the contacting in step (b) is performed in an inert atmosphere.

Embodiment 21

The process defined in any one of the preceding embodiments, wherein the vapor comprises any suitable amount of the fluorine-containing compound, or any amount of the fluorine-containing compound disclosed herein, e.g., from about 100 ppmv to about 20 volume %, or from about 1000 ppmv to about 10 volume %.

Embodiment 22

The process defined in any one of the preceding embodiments, further comprising a step of contacting the fluorided chromium catalyst after step (b) with carbon monoxide under conditions sufficient to change an oxidation state of at least a portion of the chromium to divalent chromium.

Embodiment 23

The process defined in embodiment 22, wherein the conditions comprise a reducing temperature in any suitable range, or a reducing temperature in any range disclosed herein, e.g., from about 200° C. to about 600° C., from about 250° C. to about 550° C., or from about 300° C. to about 500° C.

Embodiment 24

The process defined in embodiment 22 or 23, wherein the conditions comprise a reducing time in any suitable range, or a reducing time in any range disclosed herein, e.g., from about 5 minutes to about 15 hours, from about 5 minutes to about 8 hours, or from about 10 minutes to about 5 hours.

Embodiment 25

The process defined in any one of the preceding embodiments, wherein the fluorided chromium catalyst has a pore volume (total) in any suitable range, or any range disclosed herein, e.g., from about 0.5 to about 5 mL/g, from about 1 to about 5 mL/g, from about 1 to about 3 mL/g, or from about 1.2 to about 2.5 mL/g.

Embodiment 26

The process defined in any one of the preceding embodiments, wherein the fluorided chromium catalyst has a surface area in any suitable range, or any range disclosed herein, e.g., from about 200 to about 700 $m^2/g$, from about 250 to about 550 $m^2/g$, or from about 275 to about 525 $m^2/g$.

Embodiment 27

The process defined in any one of the preceding embodiments, wherein the surface area of the fluorided chromium catalyst produced by the process is at least about 5% greater (e.g., at least about 10% greater, may be no upper limit) than a surface area of a fluorided chromium catalyst obtained by performing the contacting step at the peak calcining temperature.

Embodiment 28

The process defined in any one of the preceding embodiments, wherein the catalyst activity of the fluorided chromium catalyst produced by the process is greater (e.g., at least about 10% greater, at least about 20% greater, at least about 30% greater, at least about 50% greater, up to 1000%, or no upper limit) than that of a catalyst system containing a fluorided chromium catalyst obtained by performing the contacting step at the peak calcining temperature.

Embodiment 29

The process defined in any one of the preceding embodiments, wherein the fluorided chromium catalyst is orange.

Embodiment 30

A fluorided chromium catalyst produced by the process defined in any one of the preceding embodiments.

Embodiment 31

A fluorided chromium/silica catalyst produced by the process defined in any one of the preceding embodiments, wherein the catalyst contains from about 0.5 to about 5 wt. % chromium and from about 0.5 to about 5 wt. % fluorine, and is characterized by a surface area in a range from about 200 to about 700 $m^2/g$, and from about 40 to 100% of the chromium is present as Cr(VI).

Embodiment 32

A fluorided chromium/silica-titania catalyst produced the process defined in any one of the preceding embodiments, wherein the catalyst contains from about 0.5 to about 5 wt. % chromium and from about 0.5 to about 5 wt. % fluorine, and is characterized by a surface area in a range from about 300 to about 700 $m^2/g$, and from about 40 to 100% of the chromium is present as Cr(VI).

Embodiment 33

An olefin polymerization process, the olefin polymerization process comprising (i) performing the process to produce the fluorided chromium catalyst defined in any one of embodiments 1-29, and (ii) contacting the fluorided chromium catalyst and an optional co-catalyst with an olefin monomer and an optional olefin comonomer in a polymerization reactor system under polymerization conditions to produce an olefin polymer.

Embodiment 34

An olefin polymerization process, the process comprising contacting the fluorided chromium catalyst defined in any one of embodiments 30-32 and an optional co-catalyst with an olefin monomer and an optional olefin comonomer in a polymerization reactor system under polymerization conditions to produce an olefin polymer.

Embodiment 35

The olefin polymerization process defined in embodiment 33 or 34, wherein a co-catalyst is used, and the co-catalyst comprises any suitable co-catalyst, or any co-catalyst disclosed herein, e.g., an aluminoxane co-catalyst, an organoaluminum co-catalyst, an organoboron co-catalyst, or any combination thereof.

Embodiment 36

The olefin polymerization process defined in any one of embodiments 33-35, wherein the olefin monomer comprises any olefin monomer disclosed herein, e.g., any $C_2$-$C_{20}$ olefin.

Embodiment 37

The olefin polymerization process defined in any one of embodiments 33-36, wherein the olefin monomer and the optional olefin comonomer independently comprise a $C_2$-$C_{20}$ alpha-olefin.

Embodiment 38

The olefin polymerization process defined in any one of embodiments 33-37, wherein the olefin monomer comprises ethylene.

Embodiment 39

The olefin polymerization process defined in any one of embodiments 33-38, wherein the chromium catalyst is contacted with ethylene and an olefin comonomer comprising a $C_3$-$C_{10}$ alpha-olefin.

Embodiment 40

The olefin polymerization process defined in any one of embodiments 33-39, wherein the chromium catalyst is contacted with ethylene and an olefin comonomer comprising 1-butene, 1-hexene, 1-octene, or a mixture thereof.

Embodiment 41

The olefin polymerization process defined in any one of embodiments 33-37, wherein the olefin monomer comprises propylene.

Embodiment 42

The olefin polymerization process defined in any one of embodiments 33-41, wherein the polymerization reactor system comprises a batch reactor, a slurry reactor, a gas-phase reactor, a solution reactor, a high pressure reactor, a tubular reactor, an autoclave reactor, or a combination thereof.

Embodiment 43

The olefin polymerization process defined in any one of embodiments 33-42, wherein the polymerization reactor system comprises a slurry reactor, a gas-phase reactor, a solution reactor, or a combination thereof.

Embodiment 44

The olefin polymerization process defined in any one of embodiments 33-43, wherein the polymerization reactor system comprises a loop slurry reactor.

Embodiment 45

The olefin polymerization process defined in any one of embodiments 33-44, wherein the polymerization reactor system comprises a single reactor.

Embodiment 46

The olefin polymerization process defined in any one of embodiments 33-44, wherein the polymerization reactor system comprises 2 reactors.

Embodiment 47

The olefin polymerization process defined in any one of embodiments 33-44, wherein the polymerization reactor system comprises more than 2 reactors.

Embodiment 48

The olefin polymerization process defined in any one of embodiments 33-47, wherein the olefin polymer comprises any olefin polymer disclosed herein.

Embodiment 49

The olefin polymerization process defined in any one of embodiments 33-48, wherein the olefin polymer is an ethylene/1-butene copolymer, an ethylene/1-hexene copolymer, or an ethylene/1-octene copolymer.

Embodiment 50

The olefin polymerization process defined in any one of embodiments 33-49, wherein the olefin polymer is an ethylene/1-hexene copolymer.

Embodiment 51

The olefin polymerization process defined in any one of embodiments 33-37 and 41-48, wherein the olefin polymer is a polypropylene homopolymer or a propylene-based copolymer.

Embodiment 52

The olefin polymerization process defined in any one of embodiments 33-51, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 53

The olefin polymerization process defined in any one of embodiments 33-52, wherein the polymerization conditions are substantially constant, e.g., for a particular polymer grade.

Embodiment 54

The olefin polymerization process defined in any one of embodiments 33-53, wherein no hydrogen is added to the polymerization reactor system.

Embodiment 55

The olefin polymerization process defined in any one of embodiments 33-53, wherein hydrogen is added to the polymerization reactor system.

Embodiment 56

The olefin polymerization process defined in any one of embodiments 33-55, wherein the HLMI of the olefin polymer is less than that of an olefin polymer obtained without using step (b) of the process to produce the fluorided chromium catalyst, under the same polymerization conditions.

Embodiment 57

The olefin polymerization process defined in any one of embodiments 33-56, wherein the ratio of Mw/Mn of the olefin polymer is greater than that of an olefin polymer obtained without using step (b) of the process to produce the fluorided chromium catalyst, under the same polymerization conditions.

Embodiment 58

The olefin polymerization process defined in any one of embodiments 33-57, wherein the melt flow ratio ($I_{21}/I_{10}$) of the olefin polymer is greater than that of an olefin polymer obtained without using step (b) of the process to produce the fluorided chromium catalyst, under the same polymerization conditions.

Embodiment 59

The olefin polymerization process defined in any one of embodiments 33-58, wherein the number of long chain branches (LCB's) per 1,000,000 total carbon atoms is less than that of an olefin polymer obtained without using step (b) of the process to produce the fluorided chromium catalyst, under the same polymerization conditions.

Embodiment 60

The olefin polymerization process defined in any one of embodiments 33-59, wherein the HLMI of the olefin polymer is greater than that of an olefin polymer obtained by using a fluorided chromium catalyst activated at a temperature of about 650-700° C., under the same polymerization conditions.

Embodiment 61

The olefin polymerization process defined in any one of embodiments 33-60, wherein the ratio of Mw/Mn of the olefin polymer is less than that of an olefin polymer obtained by using a fluorided chromium catalyst activated at a temperature of about 650-700° C., under the same polymerization conditions.

Embodiment 62

The olefin polymerization process defined in any one of embodiments 33-61, wherein the number of long chain branches (LCB's) per 1,000,000 total carbon atoms is less than that of an olefin polymer obtained by using a fluorided chromium catalyst activated at a temperature of about 650-700° C., under the same polymerization conditions.

Embodiment 63

The olefin polymerization process defined in any one of embodiments 33-62, wherein the olefin polymer has less than or equal to about 15 LCB's per 1,000,000 total carbon atoms, e.g., less than or equal to about 10 LCB's, or less than or equal to about 8 LCB's.

Embodiment 64

The olefin polymerization process defined in any one of embodiments 33-63, wherein the olefin polymer has a density in any range disclosed herein, e.g., from about 0.90 to about 0.97, from about 0.92 to about 0.96, from about 0.93 to about 0.955, or from about 0.94 to about 0.955 g/cm$^3$.

Embodiment 65

The olefin polymerization process defined in any one of embodiments 33-64, wherein the olefin polymer has a HLMI in any range disclosed herein, e.g., from about 1 to about 80, from about 2 to about 70, or from about 3 to about 60 g/10 min.

Embodiment 66

The olefin polymerization process defined in any one of embodiments 33-65, wherein the olefin polymer has a ratio of Mw/Mn in any range disclosed herein, e.g., from about 5 to about 30, from about 6 to about 25, or from about 7 to about 20.

Embodiment 67

The olefin polymerization process defined in any one of embodiments 33-66, wherein the olefin polymer has a ratio of Mz/Mw in any range disclosed herein, e.g., from about 5 to about 14, from about 6 to about 14, or from about 6 to about 12.

Embodiment 68

An olefin polymer produced by the olefin polymerization process defined in any one of embodiments 33-67.

Embodiment 69

An article of manufacture comprising the polymer defined in embodiment 68.

Embodiment 70

A method for forming or preparing an article of manufacture comprising an olefin polymer, the method comprising (i) performing the olefin polymerization process defined in any one of embodiments 33-67 to produce the olefin polymer, and (ii) forming the article of manufacture comprising the olefin polymer via any suitable technique or technique disclosed herein.

Embodiment 71

The article defined in embodiment 69 or 70, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. A process to produce a fluorided chromium catalyst, the process comprising:
   (a) calcining a supported chromium catalyst at a peak calcining temperature to produce a calcined supported chromium catalyst; and
   (b) contacting the calcined supported chromium catalyst at a peak fluoriding temperature with a vapor comprising a fluorine-containing compound to produce the fluorided chromium catalyst;
   wherein the peak fluoriding temperature is at least about 50° C. less than the peak calcining temperature.

2. The process of claim 1, wherein:
   the peak calcining temperature is in a range from about 725° C. to about 900° C.;
   the peak fluoriding temperature is in a range from about 300° C. to about 675° C.;
   the peak fluoriding temperature is from about 100° C. to about 600° C. less than the peak calcining temperature; or
   any combination thereof.

3. The process of claim 1, wherein:
   the peak calcining temperature is in a range from about 600° C. to about 871° C.;
   the peak fluoriding temperature is in a range from about 300° C. to about 500° C.;
   the peak fluoriding temperature is from about 200° C. to about 500° C. less than the peak calcining temperature; or
   any combination thereof.

4. The process of claim 1, wherein the fluorided chromium catalyst comprises fluorided chromium/silica, fluorided chromium/silica-titania, fluorided chromium/silica-titania-magnesia, fluorided chromium/silica-alumina, fluorided chromium/alumina, fluorided chromium/phosphated alumina, or a combination thereof.

5. The process of claim 1, wherein the fluorine-containing compound comprises a fluorocarbon.

6. The process of claim 1, wherein the fluorine-containing compound comprises perfluorohexane, perfluoroacetic anhydride, tetrafluoroethane, or a combination thereof.

7. The process of claim 1, wherein the fluorided chromium catalyst comprises:
   from about 0.1 to about 10 wt. % chromium; and
   from about 0.25 to about 8 wt. % fluorine.

8. The process of claim 1, wherein step (a) and step (b) are performed in an oxidizing atmosphere.

9. The process of claim 1, wherein:
   the contacting in step (b) is performed for a time period ranging from about 10 minutes to about 6 hours; and
   the fluorine-containing compound is present in the vapor for less than about 25% of the contacting time period in step (b).

10. The process of claim 1, wherein the fluorided chromium catalyst has:
    a pore volume in a range from about 1 to about 5 mL/g; and
    a surface area in a range from about 200 to about 550 m$^2$/g.

11. The process of claim 1, wherein the surface area of the fluorided chromium catalyst produced by the process is at least about 10% greater than a surface area of a fluorided chromium catalyst obtained by performing the contacting step at the peak calcining temperature.

12. The process of claim 1, wherein a catalyst activity of the fluorided chromium catalyst produced by the process is at least about 10% greater than that of a fluorided chromium catalyst obtained by performing the contacting step at the peak calcining temperature, under the same polymerization conditions.

13. An olefin polymerization process, the olefin polymerization process comprising:
    (i) calcining a supported chromium catalyst at a peak calcining temperature to produce a calcined supported chromium catalyst;
    (ii) contacting the calcined supported chromium catalyst at a peak fluoriding temperature with a vapor comprising a fluorine-containing compound to produce a fluorided chromium catalyst, wherein the peak fluoriding temperature is from about 100° C. to about 600° C. less than the peak calcining temperature; and
    (iii) contacting the fluorided chromium catalyst and an optional co-catalyst with an olefin monomer and an optional olefin comonomer in a polymerization reactor system under polymerization conditions to produce an olefin polymer.

14. The olefin polymerization process of claim 13, wherein:
    the olefin monomer comprises ethylene or propylene; and
    the polymerization reactor system comprises a slurry reactor, a gas-phase reactor, a solution reactor, or a combination thereof.

15. The olefin polymerization process of claim 13, wherein:
    the fluorided chromium catalyst and a co-catalyst are contacted with ethylene and an olefin comonomer comprising a $C_3$-$C_{10}$ alpha-olefin; and
    the polymerization reactor system comprises a loop slurry reactor.

16. The olefin polymerization process of claim 13, wherein:
    a number of long chain branches per 1,000,000 total carbon atoms of the olefin polymer is less than that of an olefin polymer obtained without using step (ii) of the process, under the same polymerization conditions;
    a HLMI of the olefin polymer is less than that of an olefin polymer obtained without using step (ii) of the process, under the same polymerization conditions;
    a ratio of Mw/Mn of the olefin polymer is greater than that of an olefin polymer obtained without using step (ii) of the process, under the same polymerization conditions;

a ratio of $I_{21}/I_{10}$ of the olefin polymer is greater than that of an olefin polymer obtained without using step (ii) of the process, under the same polymerization conditions; or any combination thereof.

17. The olefin polymerization process of claim 13, wherein:
a HLMI of the olefin polymer is greater than that of an olefin polymer obtained by using a fluorided chromium catalyst activated at a temperature of about 650-700° C., under the same polymerization conditions;
a ratio of Mw/Mn of the olefin polymer is less than that of an olefin polymer obtained by using a fluorided chromium catalyst activated at a temperature of about 650-700° C., under the same polymerization conditions;
a number of long chain branches (LCB's) per 1,000,000 total carbon atoms of the olefin polymer is less than that of an olefin polymer obtained by using a fluorided chromium catalyst activated at a temperature of about 650-700° C., under the same polymerization conditions; or any combination thereof.

18. The olefin polymerization process of claim 13, wherein the olefin polymer is an ethylene homopolymer, an ethylene/1-butene copolymer, an ethylene/1-hexene copolymer, or an ethylene/1-octene copolymer.

19. The olefin polymerization process of claim 18, wherein the olefin polymer is characterized by:
a HLMI in a range from about 2 to about 70 g/10 min;
a density in a range from about 0.92 to about 0.96 g/cm$^3$;
a ratio of Mw/Mn in a range about 6 to about 25;
a ratio of Mz/Mw in a range from about 6 to about 12; and
less than or equal to about 10 LCB's per 1,000,000 total carbon atoms.

* * * * *